United States Patent
Liu et al.

(10) Patent No.: US 12,071,021 B2
(45) Date of Patent: Aug. 27, 2024

(54) ELECTRIC MACHINE AND CONTROL SYSTEM FOR A VEHICLE POWERED BY THE ELECTRIC MACHINE

(71) Applicant: FORD GLOBAL TECHNOLOGIES, LLC, Dearborn, MI (US)

(72) Inventors: Wenbo Liu, Van Buren Township, MI (US); Jiyao Wang, Canton, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 847 days.

(21) Appl. No.: 17/117,734

(22) Filed: Dec. 10, 2020

(65) Prior Publication Data
US 2022/0185120 A1    Jun. 16, 2022

(51) Int. Cl.
| | |
|---|---|
| *B60L 15/20* | (2006.01) |
| *H02P 6/08* | (2016.01) |
| *H02P 6/28* | (2016.01) |
| *H02P 21/14* | (2016.01) |
| *H02P 31/00* | (2006.01) |

(52) U.S. Cl.
CPC ........... *B60L 15/20* (2013.01); *H02P 6/08* (2013.01); *H02P 6/28* (2016.02); *H02P 21/14* (2013.01); *H02P 21/141* (2013.01); *H02P 31/00* (2013.01); *H02K 2201/03* (2013.01); *H02P 2207/05* (2013.01)

(58) Field of Classification Search
CPC .. H02P 31/00; H02P 6/28; H02P 21/14; H02P 6/08; H02P 21/141; H02P 2207/05; B60L 15/20; B60L 2240/421; B60L 2220/50; B60L 2240/423; B60L 2240/427; Y02T 10/70; Y02T 10/62; H02K 2201/03

USPC .......................................................... 318/567
See application file for complete search history.

(56) References Cited

U.S. PATENT DOCUMENTS

| | | | | |
|---|---|---|---|---|
| 5,034,639 A * | 7/1991 | Huss | ........................ | H02K 9/19 310/58 |
| 2010/0259208 A1* | 10/2010 | Hao | ...................... | H02K 21/028 310/154.49 |
| 2013/0187501 A1* | 7/2013 | Theobald | ................ | B60L 50/61 310/114 |

(Continued)

FOREIGN PATENT DOCUMENTS

EP            3633827 A1       4/2020

OTHER PUBLICATIONS

Urquhart, Iain, et al. "Mechanically actuated variable flux IPMSM for EV and HEV applications." World Electric Vehicle Journal 6.3 (2013): 684-695.

*Primary Examiner* — Gabriel Agared
(74) *Attorney, Agent, or Firm* — David B Kelley; Brooks Kushman P.C.

(57) ABSTRACT

An electric machine includes a rotor and a stator. The rotor is configured to generate rotational motion. The stator is disposed radially about the rotor. The stator has a core and windings. The core defines a first array of orifices about an inner diameter of the core and a second array of orifices radially outward from the first array of orifices. The windings are disposed within the first array of orifices. A magnetic material is configured to advance into and retract from the second array of orifices to adjust a magnetic flux within an airgap defined between the rotor and the stator.

12 Claims, 5 Drawing Sheets

(56) References Cited

U.S. PATENT DOCUMENTS

| | | | |
|---|---|---|---|
| 2015/0171674 A1* | 6/2015 | Lee | H02P 25/22 |
| | | | 310/46 |
| 2015/0318772 A1* | 11/2015 | Jahshan | B60L 50/40 |
| | | | 318/400.41 |
| 2017/0334297 A1* | 11/2017 | Hao | H02K 21/16 |
| 2017/0338706 A1* | 11/2017 | Hao | H02K 1/276 |
| 2019/0207447 A1* | 7/2019 | Swales | H02K 1/2766 |
| 2019/0341820 A1 | 11/2019 | Krizan et al. | |

* cited by examiner

ELECTRIC MACHINE AND CONTROL SYSTEM FOR A VEHICLE POWERED BY THE ELECTRIC MACHINE

TECHNICAL FIELD

The present disclosure relates to electric machines and control systems for hybrid/electric vehicles that are powered by electric machines.

BACKGROUND

Electric and hybrid vehicles may include electric machines that are configured to propel the vehicle.

SUMMARY

A vehicle includes an electric machine and a controller. The electric machine is configured to propel the vehicle. The electric machine has a rotor and a stator disposed radially about the rotor. The stator has a core, windings, and a magnetic material. The windings are disposed within a first array of orifices that are defined about an inner diameter of the core. The magnetic material is configured to advance into and retract from a second array of orifices defined within the core radially outward of the first array of orifices. The controller is programmed to, in response to a command to decrease the magnetic flux within the airgap defined between the rotor and the stator from a first value, sequentially reduce the torque of the electric machine to zero, control the electrical current within the windings to reduce the magnetic flux and the voltage of the electric machine to zero, retract the magnetic material from the second array of orifices while the torque, magnetic flux, and voltage are zero, and control the electrical current within the windings to increase the voltage and to increase the magnetic flux to less than the first value to drive the torque of the electric machine to a desired torque value.

An electric machine includes a rotor and a stator. The rotor is configured to generate rotational motion. The stator is disposed radially about the rotor. The stator has a core and windings. The core defines a first array of orifices about an inner diameter of the core and a second array of orifices radially outward from the first array of orifices. The windings are disposed within the first array of orifices. A magnetic material is configured to advance into and retract from the second array of orifices to adjust a magnetic flux within an airgap defined between the rotor and the stator.

A vehicle includes an electric machine and a controller. The electric machine is configured to propel the vehicle. The electric machine has a rotor and a stator disposed radially about the rotor. The stator has a core, windings, and a magnetic material. The windings are disposed within a first array of orifices defined about an inner diameter of the core. The magnetic material is configured to advance into and retract from a second array of orifices defined within the core radially outward of the first array of orifices. The controller is programmed to advance the magnetic material into the second array of orifices, and control the electrical current within the windings to drive the torque of the electric machine to the first commanded torque.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
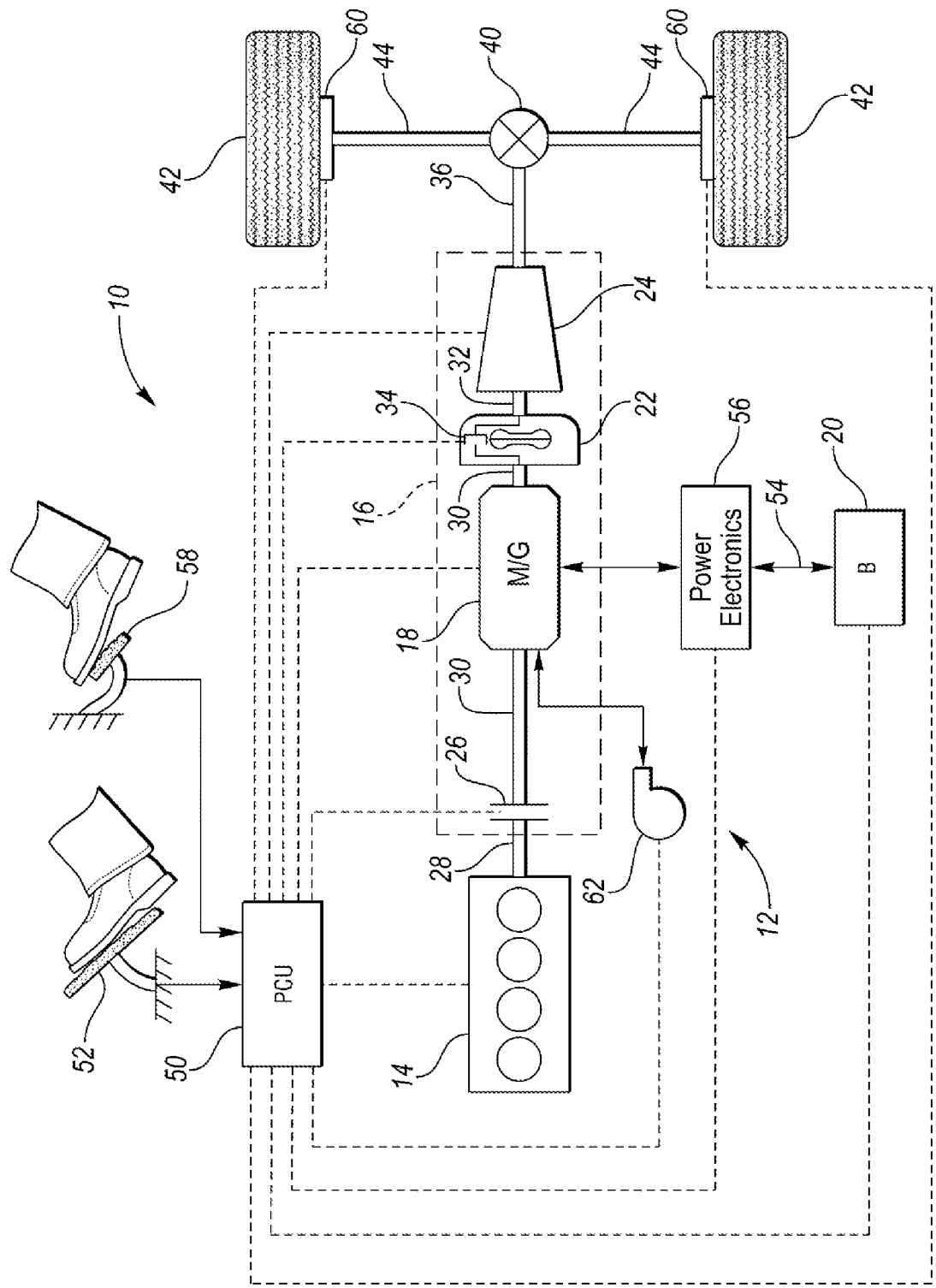
FIG. 1 is a schematic illustration of an exemplary powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential 40 transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

The vehicle 10 may include a pump 62 that is configured to pump magnetic material into and out of orifices that are defined within a stator of the M/G 18. The pump 62 may be in communication with the controller 50 and may be powered by any source described herein. For example, the pump 62 may be an electric pump that draws power from the battery 20 and/or the M/G 18.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

It should be understood that the vehicle configuration described herein is merely exemplary and is not intended to be limited. Other electric or hybrid vehicle configurations should be construed as disclosed herein. Other vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

Rare earth permanent magnets may be used to achieve high torque/power density in the design of electric machines used in hybrid and electric vehicles, since these magnets can constantly generate strong magnetic flux in the electric machine airgap (i.e., the gap between the inner diameter of the stator and the outer diameter of the rotor). However, the magnets also induce back-EMF (electromagnetic field) voltage in the windings of the stator of electric machine, which is proportional to the rotor speed of the electric machine. It should be noted that excessively high voltage at high speed is undesirable and detrimental to electric machine drive inverter. To reduce the voltage, flux weakening current is controlled to flow into the windings of the stator, generating power output losses and heat in the electric machine. In addition, the magnetic flux may also induce excessive iron losses in steel laminations that form the stator of the electric machine. The iron losses may be more severe at higher speeds of the rotor.

An important design factor in determining airgap magnetic flux is the machine airgap length (i.e., the length of the gap between the inner diameter of the stator and the outer diameter of the rotor). A larger airgap may reduce the magnetic flux so that at high speed the voltage is lower, and the loss is reduced. However, increasing the airgap to reduce the magnetic flux may in turn sacrifice the peak torque capability of the electric machine at lower speeds. On the other hand, a smaller airgap provides stronger magnetic flux and higher torque capability at lower speed, but the associated negative effects mentioned above become inevitable at higher speeds. The design of an electric machine with a fixed airgap length typically needs to consider the trade-offs between these high speed versus low speed performances.

This disclosure proposes an electric machine design that allows for adjusting the equivalent airgap length of the electric machine during runtime. The proposed design includes, adding hollow channels to the stator back iron portion, which is adjacent to each of stator slots that house the stator windings. The added hollow channels effectively enlarge machine airgap length. The hollow channels are configured to receive magnetic conductive particles or materials. The magnetic conductive particles or materials may be configured to both advance into and retract from the hollow channels. The magnetic particle materials may be in liquid form, may be an infinitesimal solid shape, or the combination of two. The particles should be significantly smaller than the dimension of hollow channels so they can easily fill the hollow channel.

A special control sequence may be utilized to advance and retract the magnetic particles into and from the hollow channels during vehicle run time. As a result, the machine airgap length may be adjusted. The airgap magnetic flux and back-EMF voltage are, therefore, adjustable via such a control method during vehicle run time. The effective airgap length is decided by the filling status of the hollow channels. The hollow channels may be filled at any time to any desirable percentage.

The advantages of such a design include, reduced back-EMF voltage and iron losses (which improves electric machine efficiency at higher operating speeds), the inverter being less prone to over voltage issues with reduced back-EMF voltage during vehicle towing, no active control is required to maintain certain airgap magnetic flux, the design may be implemented within the existing electric machine footprint (i.e., minimum modification is required from the existing machine design, and adding hollow channels introduces little to zero extra manufacturing cost to the stamping lamination process.

Figure 2:
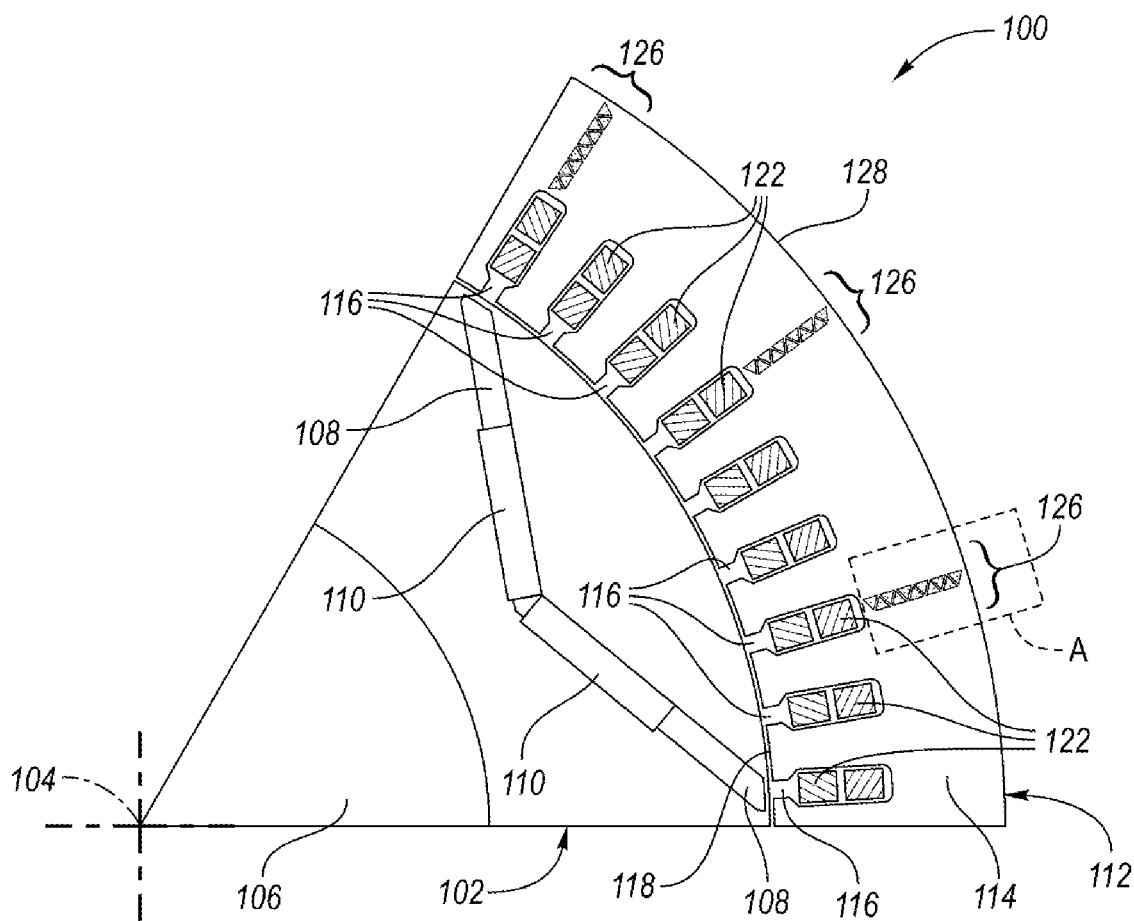
FIG. 2 is a plan view of a section of an electric machine.
Figure 3:
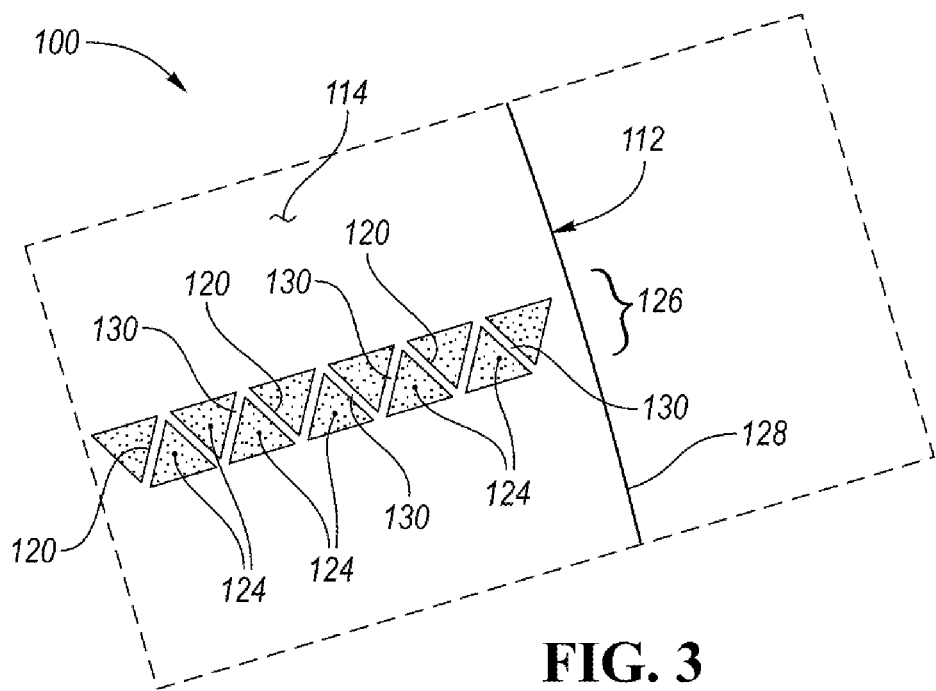
FIG. 3 is a plan view of a section of the electric machine comprising area A from FIG. 2.

Referring to FIGS. 2 and 3, a plan view of a section of an electric machine 100 (e.g., M/G 18) and area A from FIG. 2 are illustrated, respectively. The section in FIG. 2 may be representative of a single magnetic pole of the electric machine 100. The remainder of the magnetic poles of the electric machine 100 may be identical to the magnetic pole in FIG. 2. FIG. 2 represents one magnetic pole of an electric machine having six magnetic poles. However, this disclosure should not be limited to an electric machine having six magnetic poles, but should be construed to include electric machines having any number of magnetic poles.

The electric machine 100 includes a rotor 102 configured to rotate about an axis 104 to generate rotational motion. The rotor 102 (or more specifically a rotor core 106) may define cavities 108 and permanent magnets 110 may be disposed within the cavities 108. The electric machine includes a stator 112 disposed about the rotor 102. The stator 112 (or more specifically a stator core 114) defines a first array of orifices 116 about an inner diameter 118 of the stator core 114. The stator 112 (or more specifically the stator core 114) also defines a second array of orifices 120 radially outward from the first array of orifices 116. Windings 122 are disposed within the orifices of the first array of orifices 116. A magnetic material 124 is configured to advance into and retract from the second array of orifices 120 to adjust a magnetic flux within the airgap defined between the rotor 102 and the stator 112.

The second array of orifices 120 forms sets of adjacent orifices 126, wherein each set of adjacent orifices 126 are arranged in a direction that extends radially outward from one of the orifices of the first array of orifices 116 toward an outer diameter 128 of the stator core 114. The orifices within each set of adjacent orifices 126 are separated by trusses 130. The orifices within each set of adjacent orifices 126 may be triangular in shape. Alternately, the orifices within each set of adjacent orifices 126 may have any desirable shape such that the trusses 130 are arranged to provide structural support. Each set of adjacent orifices 126 may be radially aligned with one of the orifices of the first array of orifices 116. The magnetic material 124 may be a magnetic powder, a ferromagnetic fluid, a ferrofluid, a magnetic powder within a solvent (where the solvent is oil based, a ferromagnetic fluid, a ferrofluid), etc. The magnetic permeability of the magnetic material 124 is significantly greater than air and the magnetic material 124, if in liquid form, has a low viscosity in a magnetic field free environment. The magnetic material 124 may be advanced into or retracted from the second array of orifices 120 via pump 62, an actuator (e.g., if the magnetic material 124 is in solid form a servo motor, an electrical solenoid, a hydraulic, a pneumatic cylinder, or any other type of actuator may be connected to the magnetic material 124 and may be configured to advance and retract the magnetic material 124 into and from the orifices 120), or a conveyor belt tube going through the orifices 120.

The second array of orifices 120 are defined in stator back iron (i.e., the stator core 114). The magnetic flux going through the stator back iron must pass through the air in the second array of orifices 120, resulting in a low magnetic permeability path and an increase in the equivalent airgap. In order to maximize this effect, it is necessary to have the second array of orifices 120 occupy as much space in the radial direction as possible. The thickness of these channels may also be tuned for optimum machine performance.

To achieve the desired 'enlarging airgap' result, there should be minimum amount of iron inside the hollow channels to better block the flux conducting. However, in a practical design, the constraints from mechanical stress must be considered. For this reason, the truss framework (i.e., trusses 130) may be included. This minimizes the iron usage inside the channels while maintaining structural integrity.

In terms of electromagnetic performance, the permeability of the particle materials (i.e., the magnetic material 124) that fill the second array of orifices 120 may need to be significantly greater than air. In terms of mechanical property, it is also desirable that particle materials (i.e., the magnetic material 124) should have a low viscosity under certain circumstance, such that minimum effort/energy would be needed to switch between push-in and push-out filling states, where the push-in state refers to a state where the magnetic material 124 has filled the second array of orifices 120 and where the push-out states refers to a state where the magnetic material 124 has been retracted or evacuated from the second array of orifices 120. Several candidates may be suitable as magnetic material 124. A first candidate is ferrofluid or ferromagnetic fluid. Ferrofluid or ferromagnetic fluid is a liquid that becomes magnetized in the presence of a magnetic field. Ferrofluid or ferromagnetic fluid may be composed of nanoscale particles (diameter usually 10 nanometers or less) of magnetite, hematite or some other compound containing iron, and a carrier liquid or solvent. A second candidate is a ferrite solid material, such as electrical steel or a soft magnetic composite. It may be desirable to have the magnetic material in small shapes and dimensions, preferably a tiny sphere shape or powder. A third candidate is combination of the first and second candidates.

The band shape of the area surrounding the second array of orifices 120 has a similar or greater permeability as the laminations of the stator core 114 when the magnetic material 124 is in the push-in state. The magnetic property of the electric machine 100 in the push-in state may be favorable for high torque and low to medium speed operation of the electric machine 100, when large magnetic flux and back-EMF voltage are desirable. The band shape of the area surrounding the second array of orifices 120 has low permeability that is similar to air, and acts as an added airgap when the magnetic material 124 is in the push-out state. The magnetic property of the electric machine 100 in the push-out state may be favorable for low torque and high speed operation of the electric machine 100, when relatively small magnetic flux and back-EMF voltage are preferred, such that over voltage and iron loss can be mitigated.

Without special effort, an electric machine may be by default magnetized. This may make it difficult to adjust the filling state of the magnetic material 124, because the magnetic particle material 124 tends to be trapped by the magnetic flux and stick to the stator core 114 within the second array of orifices 120. A special control sequence may be followed to make the adjustment between the push-in and push-out states, as illustrated in FIG. 4.

Figure 4:
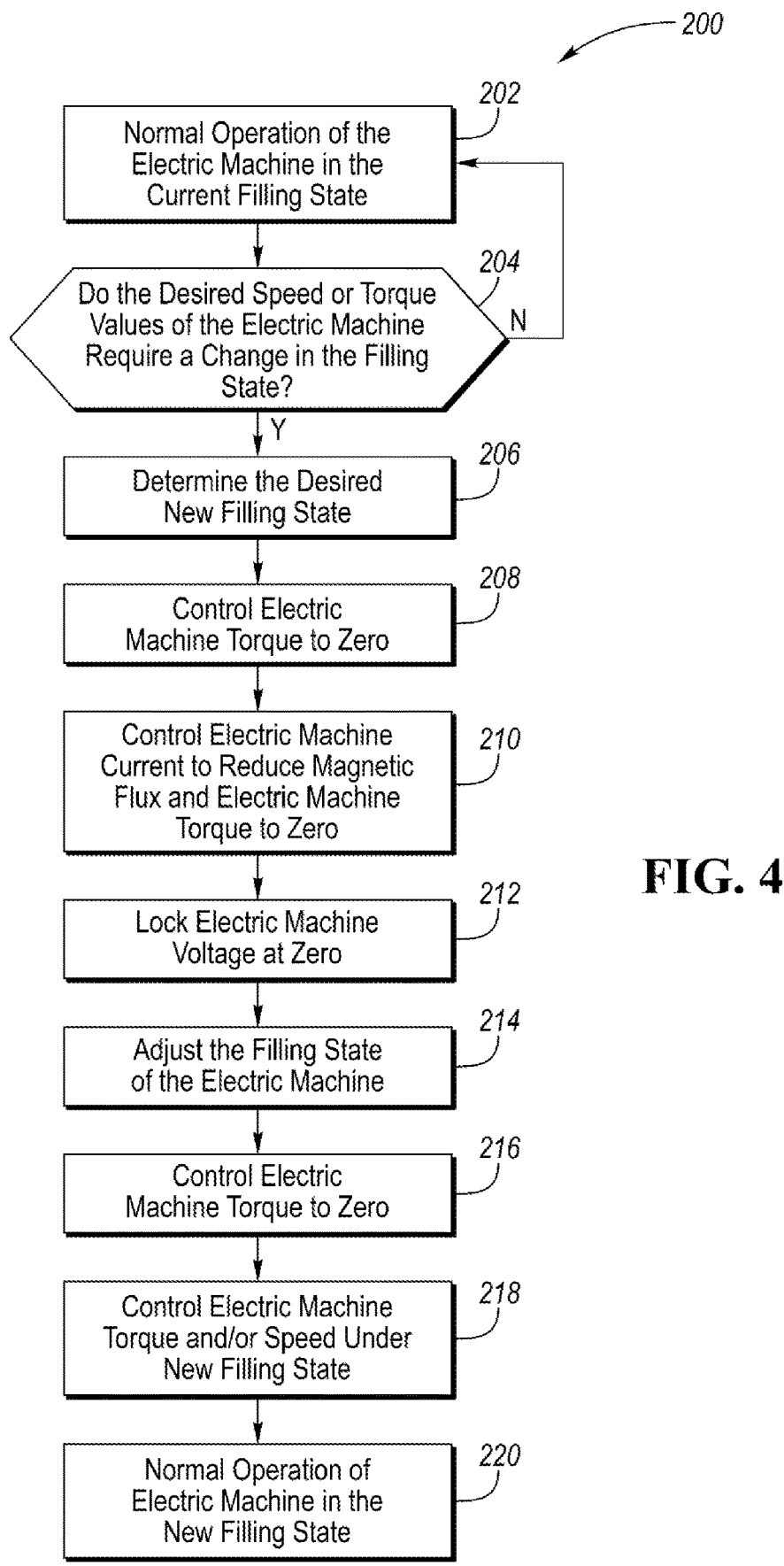
FIG. 4 is a flowchart for adjusting a state of the electric machine while being operated in a vehicle.

Referring to FIG. 4, is a flowchart of a method 200 for adjusting a state of the electric machine 100 while being operated in a vehicle (e.g., vehicle 10) is illustrated. The method 200 may be stored as control logic and/or an algorithm within the controller 50. The controller 50 may implement the method 200 by controlling the various components of the vehicle 10. The method 200 may be initiated by turning a start key or ignition of the vehicle 10 to an "on" position.

The method 200 operates the electric machine at block 202 under a normal operation in the current filling state of the electric machine 100. The current filling state of the electric machine may be either the push-in state or the push-out state, where the push-in state refers to the state where the magnetic material 124 has filled (or partially filled) the second array of orifices 120 and where the push-out states refers to a state where the magnetic material 124 has been retracted or evacuated from the second array of orifices 120.

Next, the method 200 moves on to block 204, where it is determined if desired speed and/or torque values of the electric machine 100 require a change in the filling state of the electric machine 100. More specifically, at block 204, it is determined if a command been generated to decrease the magnetic flux within the airgap (or effective airgap) defined between the rotor 102 and the stator 112 from a first value by retracting or evacuating the magnetic material 124 from the second array of orifices 120, or if a command has been generated to increase the magnetic flux within the airgap (or effective airgap) defined between the rotor 102 and the stator 112 from a second value by advancing the magnetic material 124 into second array of orifices 120 to fill or partially fill the second array of orifices 120.

A command to decrease the magnetic flux within the airgap from the first value may correspond to a desired torque command to the electric machine 100 decreasing to less than a torque threshold or a desired speed command to the electric machine 100 increasing to greater than a speed threshold. A command to increase the magnetic flux within the airgap from the second value may correspond to the desired torque command to the electric machine 100 increasing to greater than the torque threshold or the desired speed command to the electric machine 100 decreasing to less than the speed threshold. The commands for increased or decreased speed or torque of the electric machine 100 may be generated by depressing or releasing the accelerator pedal 52 and/or the brake pedal 58. The control logic to generate the commands to either increase or decrease the magnetic flux within the airgap relative to the torque and/or speed of the electric machine 100 may be based on control logic that includes hysteresis band logic, fuzzy logic, or pre-calibrated look up tables.

The method 200 next moves on to block 206, where the desired new filling state is determined. The desired new filling state may be the state where the magnetic material 124 is retracted or evacuated from the second array of orifices 120 to decrease the magnetic flux within the airgap or the desired new filling state may be the state where the magnetic material 124 is advanced into the second array of orifices 120 to fill or partially fill the second array of orifices 120 to increase the magnetic flux within the airgap.

Once the desired new filling state is determined, the torque of the electric machine 100 is reduced to zero at block 208. Zero torque of the electric machine 100 at block 208 may be achieved by delivering zero current or the minimum D-axis current to the windings 122 of the electric machine 100. Once the torque of the electric machine 100 is reduced to zero, the electrical current in the windings 122 is controlled at block 210 to reduce the magnetic flux and the voltage of the electric machine 100 to zero. The electric machine 100 current will be controlled to the electric machine 100 short circuit current (D-axis current equals the negative characteristic current). This is the current to achieve fully flux weakening of the motor, meaning the fundamental flux becomes zero or negligible and the motor terminal voltage becomes zero. This is the easiest condition to adjust the filling state since there will not be a magnetic field (or a sufficient magnetic field) to interfere with the magnetic material 124 as the magnetic material 124 enters or exits the second array of orifices 120. The voltage of the electric machine 100 is then locked at zero so that the magnetic flux remains zero at block 212.

The method 200 next moves on to block 214 where the filling state of the electric machine 100 is adjusted while the torque, magnetic flux, and voltage of the electric machine are zero. The step at block 214 may include either decreasing the magnetic flux within the airgap (or effective airgap) defined between the rotor 102 and the stator 112 from the first value by retracting or evacuating the magnetic material 124 from the second array of orifices 120 or increasing the magnetic flux within the airgap (or effective airgap) defined between the rotor 102 and the stator 112 from the second value by advancing the magnetic material 124 into second array of orifices 120 to fill or partially fill the second array of orifices 120.

The method 200 then moves on to block 216, where the electrical current within the windings 112 is controlled to adjust the voltage and the magnetic flux of the electric machine while maintaining a zero torque of the electric machine. Zero torque of the electric machine 100 at block 216 may be achieved by delivering zero current or the minimum D-axis current to the windings 122 of the electric machine 100. The method 200 then moves on to block 218 where the torque of the electric machine 100 is controlled in the new filling state.

More specifically at block 218, the electrical current within the windings 122 is controlled to increase the voltage and to increase the magnetic flux of the electric machine 100 to drive the torque or speed of the electric machine to the desired torque value or to the desired speed value in the new filling state. If the change in the state that occurred at block 214 included decreasing the magnetic flux within the airgap (or effective airgap) from the first value by retracting or evacuating the magnetic material 124 from the second array of orifices 120, the magnetic flux may be increased to a value that is less than the first value to drive the torque or speed of the electric machine to the desired torque value or to the desired speed value at block 218. If the change in the state that occurred at block 214 included increasing the magnetic flux within the airgap (or effective airgap) from the second value by advancing the magnetic material 124 into the second array of orifices 120, the magnetic flux may be increased a value that is greater than the second value to drive the torque or speed of the electric machine to the desired torque value or to the desired speed value at block 218.

Next, the method moves on to block 220, where the method 200 controls the electric machine under a normal operation in the new filling state of the electric machine 100. The new filling state of the electric machine being either the push-in state or the push-out state based on the change in the filling state that occurred at block 214.

It should be understood that the flowchart in FIG. 4 is for illustrative purposes only and that the method 200 should not be construed as limited to the flowchart in FIG. 4. Some of the steps of the method 200 may be rearranged while others may be omitted entirely. It should further be understood that the designations of first, second, third, fourth, etc. for any component, state, or condition described herein may be rearranged in the claims so that they are in chronological order with respect to the claims.

Figure 5:
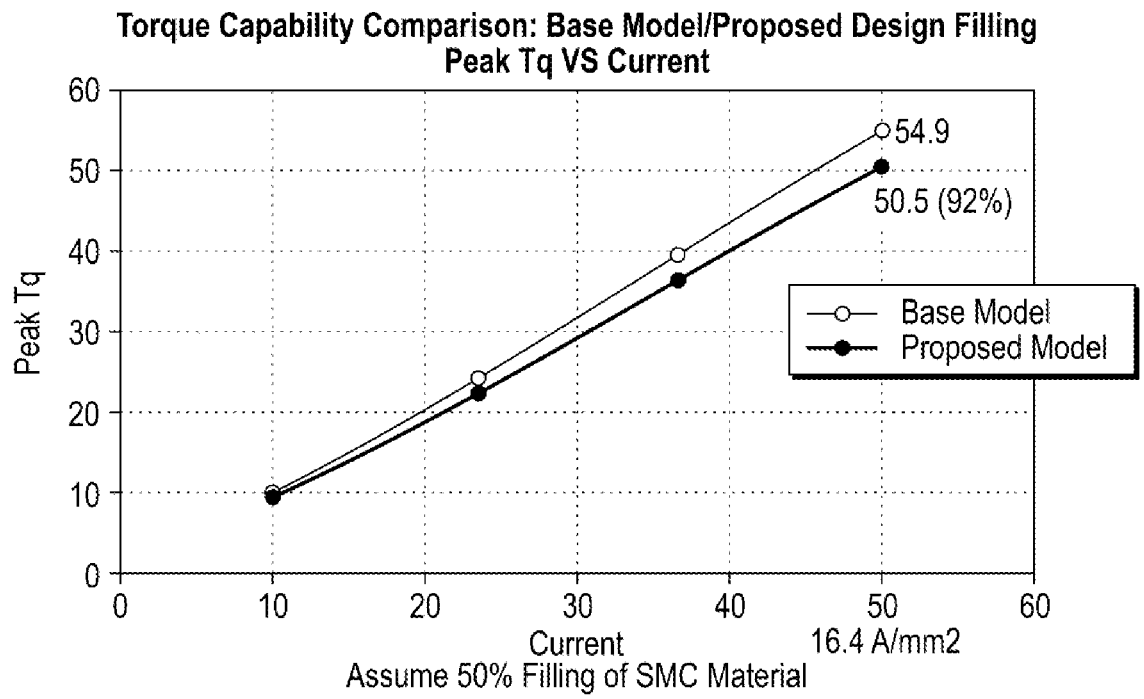
FIG. 5 is a series of graphs comparing the torque capability of the electric machine to a base model.

Referring to FIG. 5, a series of graphs comparing of the torque capability of the electric machine 100 (referred to as the proposed model in FIG. 5) relative to a base model are illustrated. The base model may correspond to a model that includes all of the attributes of the electric machine 100 with the exceptions that the second array of orifices 120 are not present and the material that comprises the stator core 114 itself occupies the space relative to where the second array of orifices 120 are defined by electric machine 100. Assuming a 50% filling of magnetic material into the second array of orifices 120, a 92% torque may be achieved relative to the base model. These results demonstrate that the performance may be further optimized and tuned upon design requirements.

Figure 6:
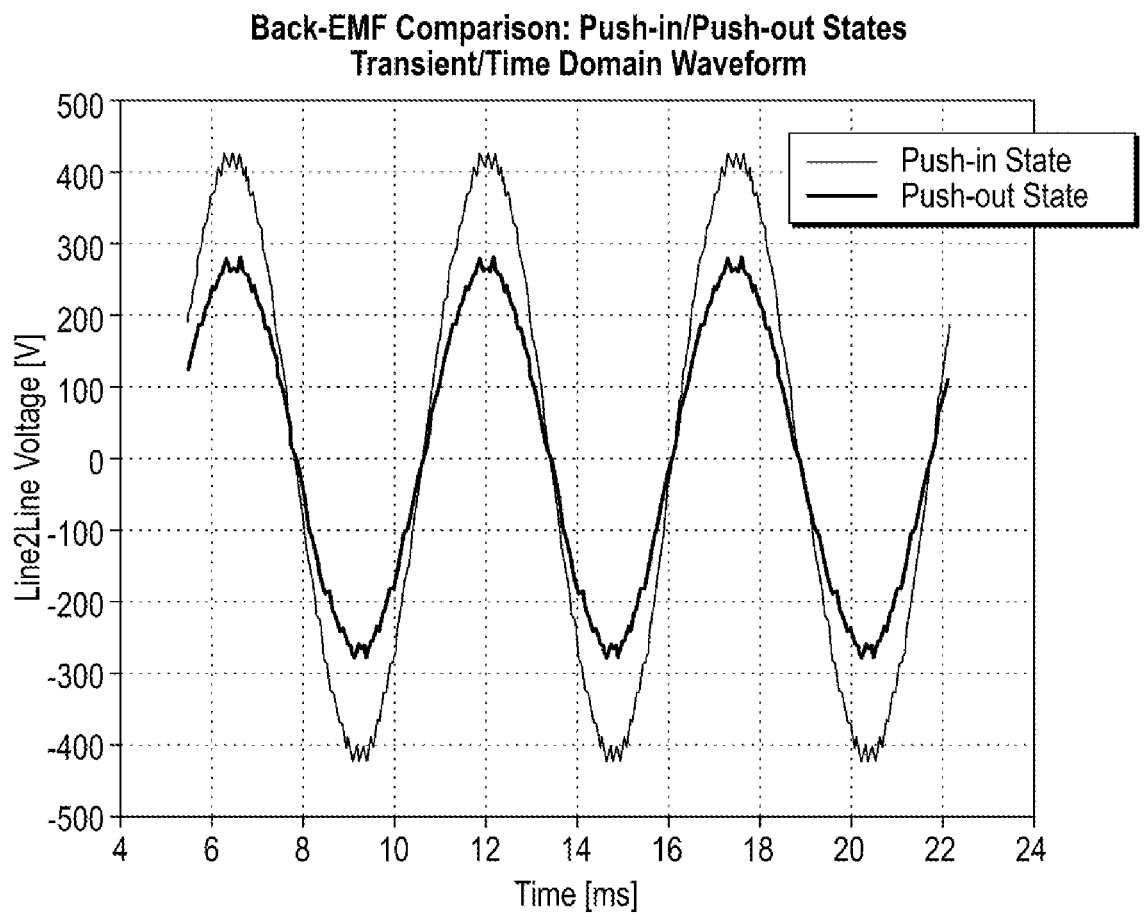
FIG. 6 is series of graphs illustrating the back electromagnetic field voltage of the electric machine in both the push-in and push-out states.

Referring to FIG. 6, a series of graphs of the back electromagnetic field voltage of the electric machine 100 in both the push-in and push-out states are illustrated. FIG. 6 provides a comparison of instantaneous back-EMF waveform between the two different states. The results suggest that back-EMF voltage can be effectively reduced by switching from push-in state to push-out state. The waveform fundamental component is effectively reduced to 65% in the push-out state relative to the push-in state. It should be noted that no active controlling is required to maintain this level of filling state, thus, neither would active losses be induced.

Figure 7:
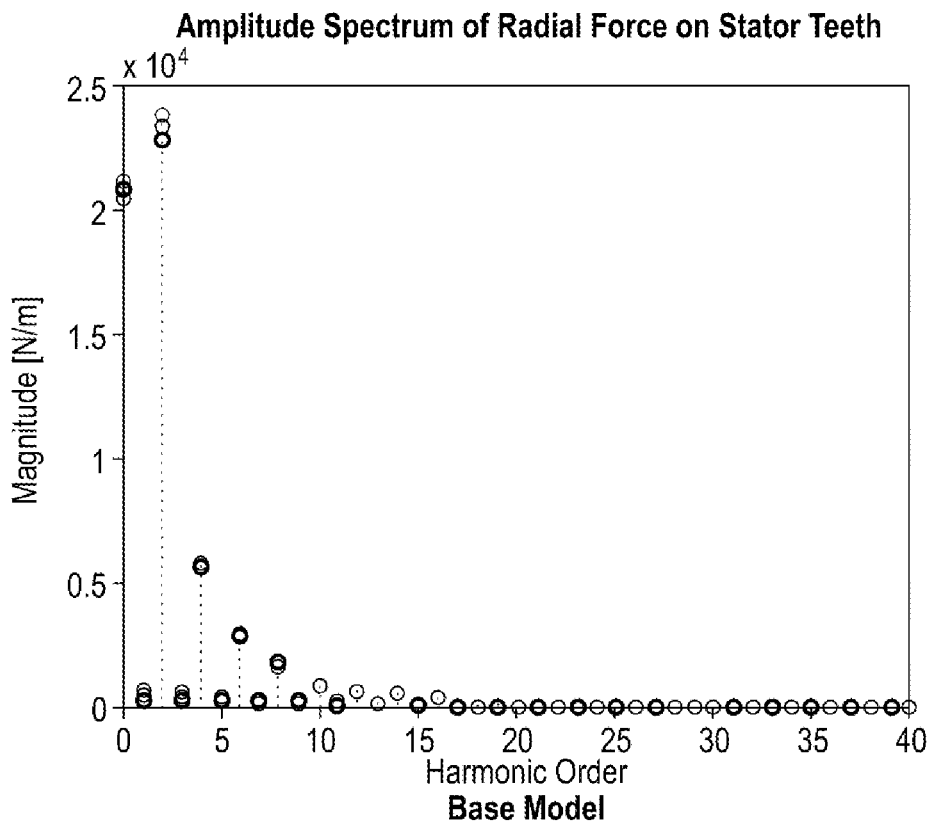
FIGS. 7 and 8 are graphs of the radial forces at various harmonics of the base model and the electric machine, respectively.
Figure 8:
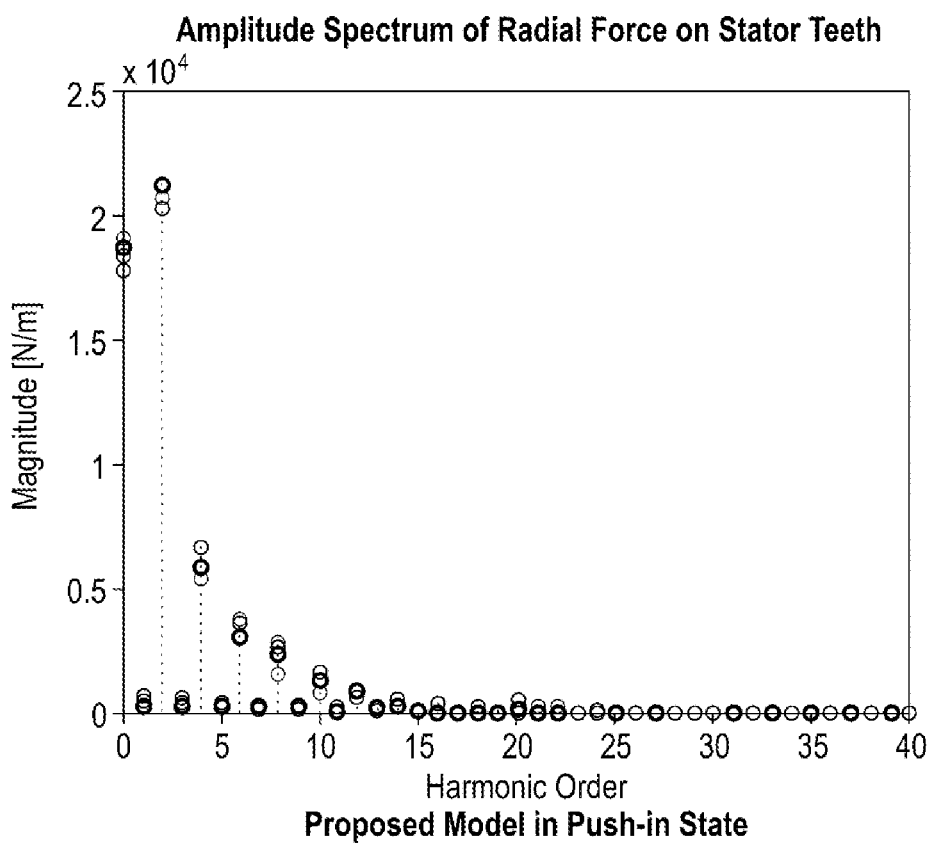

FIGS. 7 and 8 are graphs of the radial forces at various harmonics (i.e., frequencies of rotation of the rotor) of the base model and the electric machine 100 (referred to as the proposed model in FIG. 8), respectively. The radial forces are comparable with the base model having some increased magnitudes of radial forces relative to electric machine 100 at lower order harmonics. It is desirable to decrease the radial forces since the radial forces result in energy being transferred into the teeth of the stator 112 and not into rotation motion of the rotor 102.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising: an electric machine configured to propel the vehicle, the electric machine having a rotor and a stator disposed radially about the rotor, the stator having a core, windings, and a magnetic material, wherein the windings are disposed within a first array of orifices defined about an inner diameter of the core, and wherein the magnetic material is configured to advance into and retract from a second array of orifices defined within the core radially outward of the first array of orifices; and a controller programmed to, in response to a command to decrease a magnetic flux within an airgap defined between the rotor and the stator from a first value, sequentially reduce a torque of the electric machine to zero, control the electrical current within the windings to reduce the magnetic flux and a voltage of the electric machine to zero, retract the magnetic material from the second array of orifices while the torque, magnetic flux, and voltage are zero, and control the electrical current within the windings to increase the voltage and to increase the magnetic flux to less than the first value to drive the torque of the electric machine to a desired torque value, wherein the controller is further programmed to, in response to a command to increase the magnetic flux within the airgap defined between the rotor and the stator from a second value, sequentially reduce the torque of the electric machine to zero, control an electrical current within the windings to reduce the magnetic flux and the voltage of the electric machine to zero, advance the magnetic material into the second array of orifices while the torque, magnetic flux, and voltage are zero, and control the electrical current within the windings to increase the voltage and to increase the magnetic flux to greater than the second value to drive the torque of the electric machine to the desired torque value.

2. The vehicle of claim 1, wherein the controller is programmed to increase the magnetic flux from the second value in response to the desired torque increasing to greater than a threshold.

3. The vehicle of claim 1, wherein the controller is programmed to increase the magnetic flux from the second value in response to a desired speed of the electric machine decreasing to less than a threshold.

4. The vehicle of claim 1, wherein the controller is programmed to decrease the magnetic flux from the first value in response to the desired torque decreasing to less than a threshold.

5. The vehicle of claim 1, wherein the controller is programmed to decrease the magnetic flux from the first value in response to a desired speed of the electric machine increasing to greater than a threshold.

6. The vehicle of claim 1, wherein the second array of orifices forms sets of adjacent orifices, wherein each set of adjacent orifices are arranged in a direction that extends radially outward from one of the orifices of the first array of orifices toward an outer diameter of the core.

7. The vehicle of claim 6, wherein the orifices within each set of adjacent orifices are separated by trusses.

8. The vehicle of claim 6, wherein each set of adjacent orifices are radially aligned with one of the orifices of the first array of orifices.

9. A vehicle comprising:

an electric machine configured to propel the vehicle, the electric machine having a rotor and a stator disposed radially about the rotor, the stator having a core, windings, and a magnetic material, wherein the windings are disposed within a first array of orifices defined about an inner diameter of the core, and wherein the magnetic material is configured to advance into and retract from a second array of orifices defined within the core radially outward of the first array of orifices; and a controller programmed to advance the magnetic material into the second array of orifices and control the electrical current within the windings to drive a torque of the electric machine to a first commanded torque, wherein the controller is further programmed to, in response to a second commanded torque being less than the torque threshold, sequentially reduce the torque and a magnetic flux of the electric machine to zero, retract the magnetic material from the second array of orifices, control an electrical current within the windings to drive the torque of the electric machine to the second commanded torque.

10. The vehicle of claim 9, wherein the controller is further programmed to, in response to a first commanded speed value being less than a speed threshold, sequentially reduce the torque and a magnetic flux of the electric machine to zero, advance the magnetic material into the second array of orifices, and control an electrical current within the windings to drive the speed of the electric machine to the first commanded speed value.

11. The vehicle of claim 10, wherein the controller is further programmed to, in response to a second commanded speed value being greater than the speed threshold, sequentially reduce the torque and the magnetic flux of the electric machine to zero, retract the magnetic material from the second array of orifices, and control the electrical current within the windings to drive the speed of the electric machine to the second commanded speed value.

12. The vehicle of claim 9, wherein the second array of orifices forms sets of adjacent orifices, wherein each set of adjacent orifices are arranged in a direction that extends radially outward from one of the orifices of the first array of orifices toward an outer diameter of the core.

* * * * *